United States Patent [19]
Kutschera et al.

[11] Patent Number: 6,098,590
[45] Date of Patent: Aug. 8, 2000

[54] CYLINDER HEAD FOR INTERNAL COMBUSTION ENGINES

[75] Inventors: Immanuel Kutschera, Stuttgart; Ulrich Engel, Plochingen; Bernward Vethacke, Wendlingen; Hartmut Engels, Wolfschlugen; Claus Mumm, Stuttgart; Martin Mutterer, Leutenbach, all of Germany

[73] Assignee: DaimlerChrysler AG, Stuttgart, Germany

[21] Appl. No.: 08/740,471

[22] Filed: Oct. 30, 1996

[30] Foreign Application Priority Data

Oct. 30, 1995 [DE] Germany .................. 195 40 398

[51] Int. Cl.$^7$ ................................. F02B 31/08
[52] U.S. Cl. ............................ 123/308; 123/301
[58] Field of Search .................. 123/193.5, 188.14, 123/188.7, 188.8, 190.14, 308, 301

[56] References Cited

U.S. PATENT DOCUMENTS

| | | | |
|---|---|---|---|
| 2,768,618 | 10/1956 | Kincaid | 123/191 |
| 4,336,776 | 6/1982 | Sumiyoshi et al. | 123/306 |
| 4,831,976 | 5/1989 | Pozniak et al. | 123/188 S |
| 4,974,566 | 12/1990 | Russo et al. | 123/308 |
| 5,462,027 | 10/1995 | Aoyama | 123/432 |
| 5,549,088 | 8/1996 | Isaka | 123/308 |
| 5,671,709 | 9/1997 | Sokoloski | 123/193.5 |
| 5,836,284 | 11/1998 | Oda et al. | 123/308 |
| 5,860,401 | 1/1999 | Adachi et al. | 123/188.8 |

FOREIGN PATENT DOCUMENTS

| | | |
|---|---|---|
| 0 584 564 | 3/1994 | European Pat. Off. . |
| 757 317 | 12/1933 | France . |
| 234 998 | 4/1986 | German Dem. Rep. . |
| 478 415 | 6/1929 | Germany . |
| 31 41 663 | 5/1983 | Germany . |
| 931 751 | 7/1963 | United Kingdom . |
| 1 568 302 | 1/1976 | United Kingdom . |

*Primary Examiner*—Andrew M. Dolinar
*Assistant Examiner*—Mahmoud M Gimie
*Attorney, Agent, or Firm*—Klaus J. Bach

[57] ABSTRACT

A cylinder head for internal combustion engines, particularly diesel engines with direct fuel injection, which has two inlet valves per cylinder each including spin-inducing means for producing spin flow about the longitudinal axis of the associated cylinder. Having regard to the direction of spin, the leading inlet valve is provided with an eccentric, crescent-shaped chamfer facing in the general direction of spin flow, and the trailing inlet valve includes flow blocking means for preventing combustion air from exiting the trailing inlet valve in a direction opposite to the direction of spin flow.

15 Claims, 4 Drawing Sheets

CYLINDER HEAD FOR INTERNAL COMBUSTION ENGINES

BACKGROUND OF THE INVENTION

The invention relates to a cylinder head for internal combustion engines, especially diesel engines with direct fuel injection.

In high-speed diesel engines with direct fuel injection, such as mostly used in passenger vehicles and trucks, spin flow in the combustion chamber about the longitudinal axis of each cylinder is needed in order to achieve proper mixing and homogenization. Spin can be induced in combustion air either through a suitable orientation of the inlet channel or by means of an eccentric chamfer provided at the valve seat of the inlet valve.

GB-PS 1,568,302 discloses an internal combustion engine wherein the valves are arranged V-like in the cylinder head and are given an extremely pronounced tilt so that the valves, during movement thereof toward their open position, will open early in a region adjacent the cylinder wall but, due to the inclined disposition of the valve seats, will open in the region proximate to the longitudinal axis of the cylinder only near the end of the maximal valve stroke. With this conventional arrangement, combustion air entering the combustion chamber through the inlet valve is directed to flow along the wall of the cylinder parallel to the longitudinal axis thereof in order to prevent combustion air exiting the inlet valve from being short-circuited to the adjacent exhaust valve.

This known arrangement requires an extremely pronounced valve tilt of about 45 degrees, with respect to the longitudinal cylinder axis, in order to obtain the desired result, but in many engines such an extreme valve tilt cannot be realized due to space restrictions and other conditions arising from the particular construction of the engine involved. This holds true particularly of engines utilizing two inlet valves per cylinder.

DD 234 998 A3 discloses a cylinder head with a spin-inducing inlet channel for use in diesel engines employing direct fuel injection. The intent of this prior disclosure is to influence the inherent spin-inducing characteristics of the inlet channel in a manner such that the spin rate will remain constant throughout a valve stroke, and also that the maximal spin rate can be changed. To this end, this prior disclosure proposes to provide a crescent-shaped chamfer extending eccentrically, with respect to the longitudinal axis of the inlet valve, approximately halfway around the valve; this prior disclosure proposes also to provide a small concentric chamfer for the remainder of the valve's circumference.

With this known arrangement, a uniform gap is formed all around the inlet valve during the initial phase of a valve stroke so that, initially, the same amount of combustion air will flow through the valve throughout its circumference. Later in the valve stroke, a larger gap is formed at the eccentric chamfer but this will come too late to produce enough spin.

U.S. Pat. No. 2,768,618 discloses a cylinder head for an internal combustion engine including an inlet valve which is tilted relative to the longitudinal axis of the cylinder such that one section of its valve seat is near the contour defining the combustion chamber, whereas another section of the valve seat lies farther inward of the cylinder head. As a result, combustion air will tend, especially during short valve strokes, to enter the combustion chamber mainly through the section of the valve seat which is nearer the combustion chamber, thereby producing spin flow about the longitudinal axis of the cylinder.

With this known arrangement, the degree of spin obtainable depends essentially upon the tilt of the inlet valve; i.e., if there is little tilt, combustion air will enter the combustion chamber in the preferred direction only during a short part of the valve movement so that no spin or not enough spin may be produced. Of course, the degree to which an inlet valve can be tilted depends usually upon conditions dictated by the arrangement and disposition of the inlet conduits, camshaft, coolant channels, and the like.

DE-PS 478,415 discloses a cylinder head including an inlet valve wherein a chamfer for imparting to combustion air entering the cylinder a preferred direction is provided at the valve seat of the inlet valve on a side thereof distant from an inlet channel.

The chamfer in this known arrangement performs its desired function owing to the fact that, during a short valve stroke, the flow cross-sectional area is substantially larger at the chamfer than in the valve region where there is no chamfer. However, the teachings of this earlier disclosure cannot be applied to cylinder heads having two inlet valves since the combustion air entering the cylinder from the different chamfer regions would spin in opposite directions so that the flow vectors of the two air streams would essentially cancel each other.

It is the principal objective of the present invention to provide an improved cylinder head with two inlet valves including spin-inducing means for substantially enhancing spin flow about the longitudinal axis of a cylinder independently of valve tilt.

SUMMARY OF THE INVENTION

The invention attains its stated objective by providing a cylinder head for internal combustion engines including two inlet valves, and means for inducing spin-flow about the longitudinal axis of a cylinder, wherein the spin-flow inducing means include an eccentric, crescent-shaped chamfer disposed at the leading inlet valve, having regard to the direction of spin, and facing in the direction of spin, and flow blocking means associated with the trailing inlet valve, having regard to the direction of spin, said flow blocking means being disposed at the valve seat of the trailing inlet valve on the side thereof facing in the direction opposite to the direction of spin.

The chief advantage of the invention resides in that enhanced spin flow in the desired direction is obtained at both inlet valves also during short valve strokes, the flow vectors at the both valves being additive in that the streams of combustion air entering the combustion chamber therethrough will virtually "chase" each other, thereby aiding one another in producing spin. The combustion air entering the cylinder through the inlet valves will have no significant flow component militating again the formation of spin since all of it is generally aligned in the desired direction of spin flow.

Preferably, the flow blocking means is designed to be effective in blocking flow on the upstream side of the trailing inlet valve for at least 10% of maximal valve stroke in order to ensure that during a short valve stroke, all of the combustion air introduced through the trailing inlet valve will flow in the general spin direction, and none will flow in a direction opposite to the direction of spin. Only if the valve stroke continues beyond the aforesaid initial range will some of the combustion air pass through the trailing inlet valve also at its upstream side, having regard to the direction of spin flow; in order to utilize also this minor flow for promoting spin, the valve seat of the trailing inlet valve preferably is provided with an eccentric chamfer directed toward the leading inlet valve, this eccentric chamfer however being substantally smaller than the eccentric chamfer at the leading inlet valve.

A particularly desirable feature resides in that the eccentric chamfer at the leading inlet valve is curved, spanning an arc which is a function of chamfer depth and of the tilt angle of the valve shown in FIG. 2 to be about 240 degrees, and that it is directed at its widest part toward the exhaust valve located adjacent the leading inlet valve downstream thereof, having regard to the direction of spin flow. This feature produces a strong main flow spinning about the longitudinal axis of the cylinder. The eccentric chamfer at the trailing inlet valve spans an angle of only about 90 degrees.

With engines employing four valves per cylinder, it is desirable to provide a chamfer also at each of the two exhaust valves, such chamfer being directed toward the inlet valve adjacent thereto. Due to its particular size and orientation, the chamfer at the leading inlet valve extends into close proximity to the chamfer of the adjacent exhaust valve; therefore, a web-like transition for preventing interference with the spin flow is preferably provided therebetween. The chamfers at the exhaust valves are alike with respect to both size and orientation, each of them preferably spanning an arc of about 210 degrees. The valves are preferably tilted relative to the bottom plane of the cylinder head such that the valve stems of the inlet and exhaust valves extend V-like with respect to each another.

The invention will become more readily apparent from the following description of a preferred embodiment thereof described, by way of example only, with reference to the accompanying drawings.

DESCRIPTION OF THE PREFERRED EMBODIMENT

Figure 1:
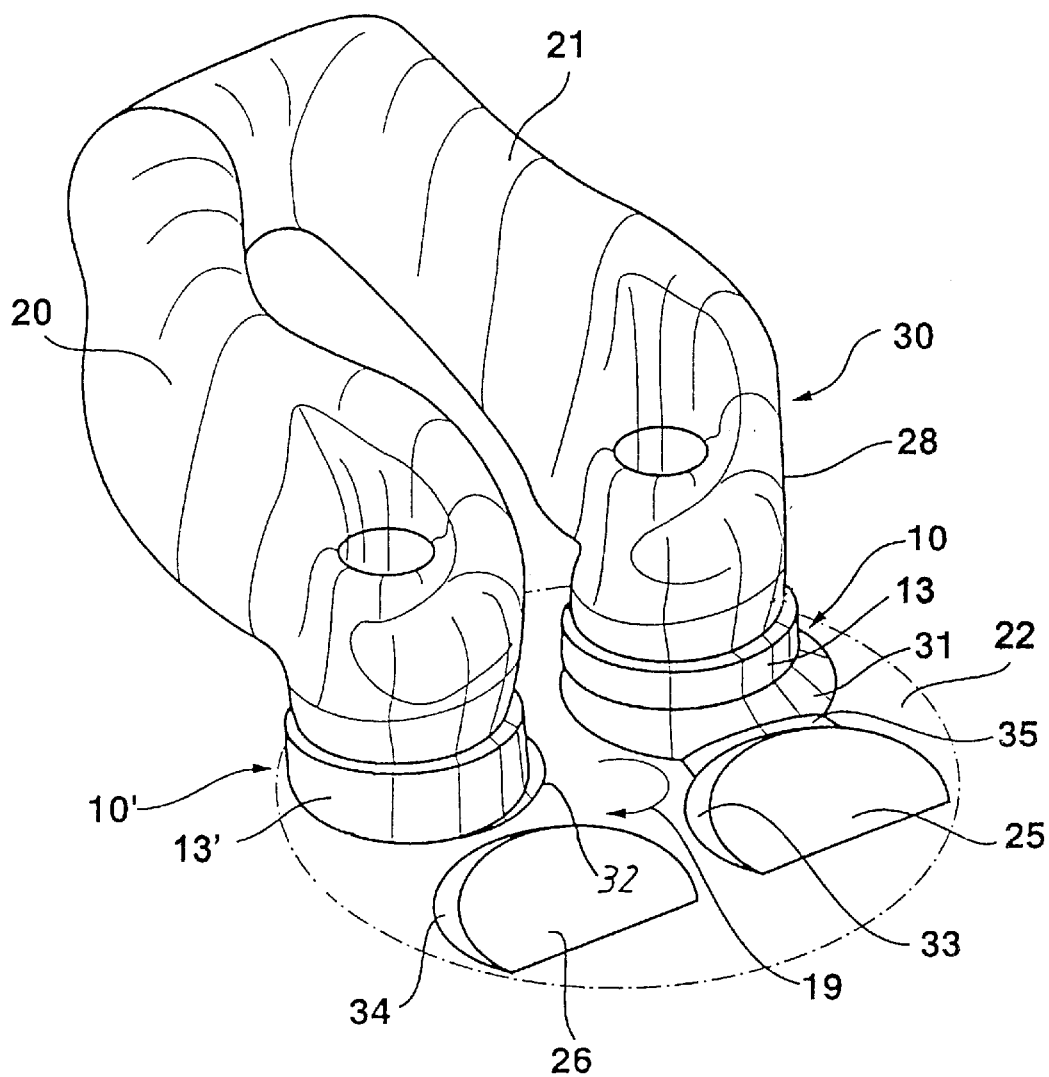
FIG. 1 is a perspective, schematic representation of two inlet channels, together with the associated inlet valves, for a cylinder of an engine utilizing four valves per cylinder.

Referring now to the drawings, FIG. 1 shows two inlet channels 20, 21 for a four-valve cylinder of an internal combustion engine, and two inlet valves 10, 10' each including a valve seat 13 or 13', respectively. The cylinder head itself is not shown, only its bottom being indicated at 22. Reference numerals 25 and 26 designate openings formed in the cylinder head for receiving exhaust valves (not shown), the openings 25 and 26 appearing in this drawing only as segments because the exhaust valves are tilted relative to the bottom plane 22, their annular valve seats or rings being inclined and tangent or nearly tangent with respect to said plane. The inlet valves 10, 10' have associated therewith means for imparting, to combustion air flowing therethrough, spin about the longitudinal axis of the associated cylinder, as indicated by an arrow 19. It should be noted that the inlet valve 10 and the inlet valve 10' are referred to herein as the leading inlet valve and the trailing inlet valve, respectively, having regard to the spin direction indicated by the arrow 19.

The spin-inducing means associated with the inlet valves 10, 10' comprise eccentric chamfers 31, 32 each extending crescent-like about the associated inlet-valve opening formed in the cylinder head. Eccentric chamfers 33 and 34 are provided also at the openings 25, 26 for the exhaust valves (not shown). The configuration and orientation of the various chamfers 31 to 34 are particularly clear from FIG. 2 wherein the same reference numerals as in FIG. 1 are used to designate like parts. As seen therefrom, the crescent-shaped chamfer 31 at the leading inlet valve 10 spans an arc of about 240 degrees and faces in the direction of spin, being directed at its widest part toward the adjacent exhaust-valve opening 25. The crescent-shaped chamfer 32 at the valve seat of the trailing intake valve 10' spans an angle of only about 90 degrees and is substantially narrower than the chamfer 31 at the leading intake valve 10, the chamfer 32 being directed at its widest part toward the leading inlet valve 10 or toward the exhaust valve opening 25 diagonally opposite the trailing intake valve 10'.

Figure 3:
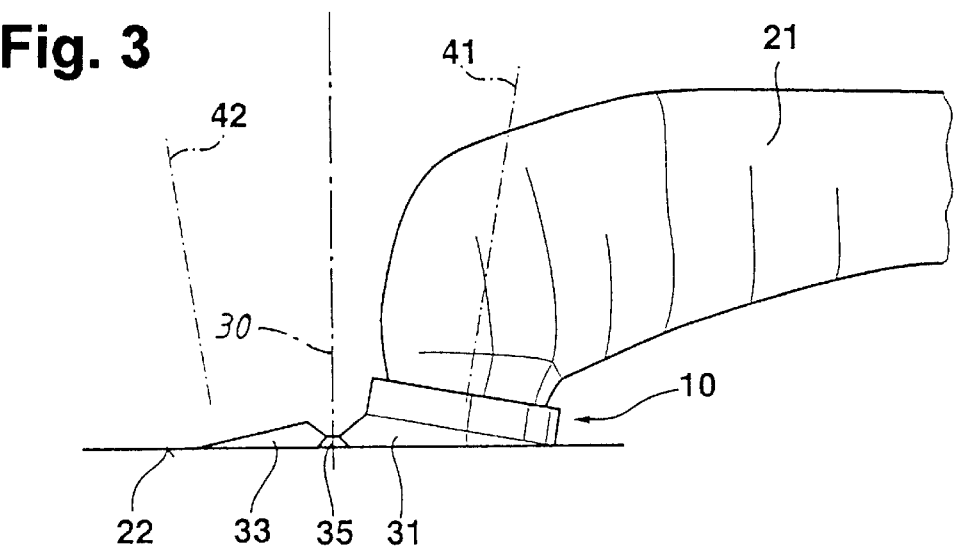
FIG. 3 is a view as seen in the direction of arrow III in FIG. 2.
Figure 6:
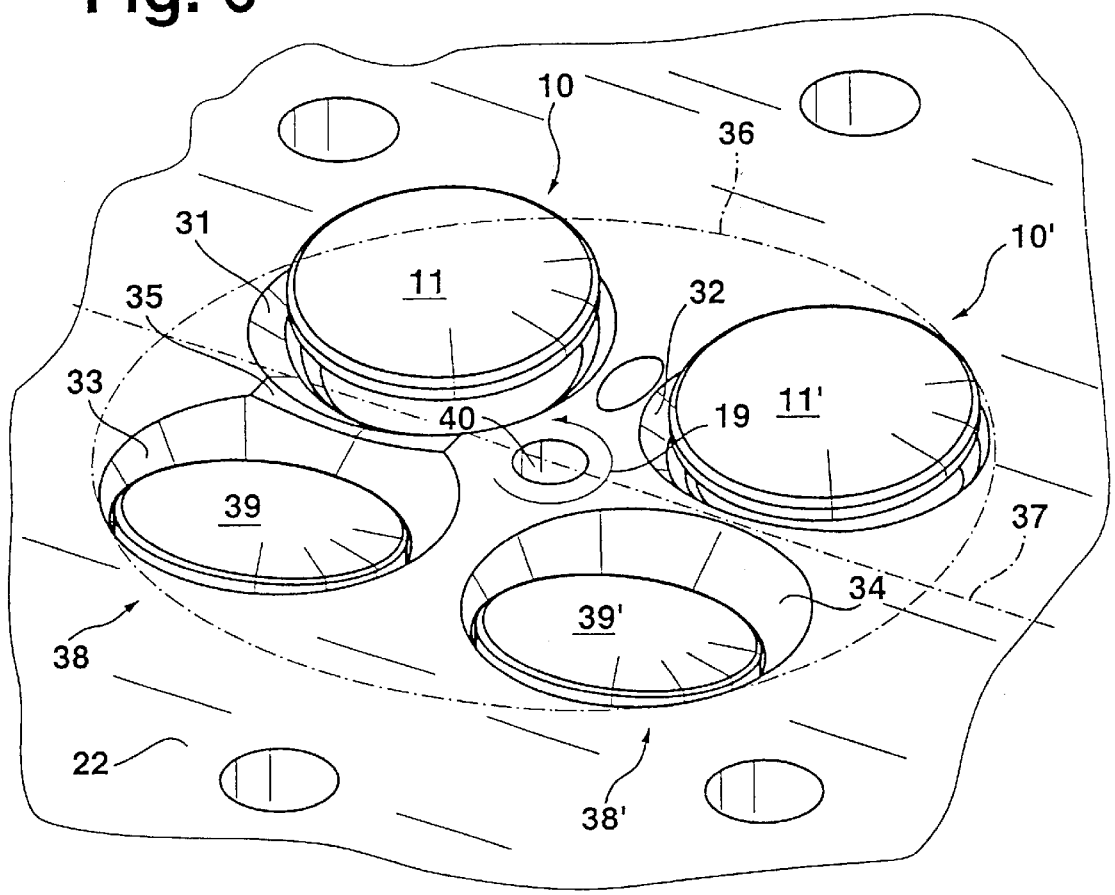
FIG. 6 is a partial bottom view of the cylinder head.

The chamfers 33 and 34 at the two openings 25 and 26 for the exhaust valves are identical to each other both in size and orientation, both chamfers 33 and 34 being crescent-shaped and spanning an arc of about 210 degrees, and each being directed at its widest part toward the inlet valve 10 or 10' adjacent thereto. Due to the smaller size and particular orientation of the chamfer 32 at the trailing inlet valve 10', there is enough space between it and the chamfer 34 at the adjacent exhaust-valve opening 26 to preclude interference with the spin flow. However, the chamfer 31 at the leading inlet valve 10 extends into close proximity to the chamfer 33 at the exhaust-valve opening 25; therefore, a web-like transition 35, configured as best seen from FIGS. 3 and 6, is provided between the two chamfers 31, 33 to prevent interference with the spin flow. With this arrangement, the main flow of combustion air through the two inlet valves 10, 10' will be as indicated by arrows 6 and 16, respectively, in FIGS. 4 and 5.

Figure 2:
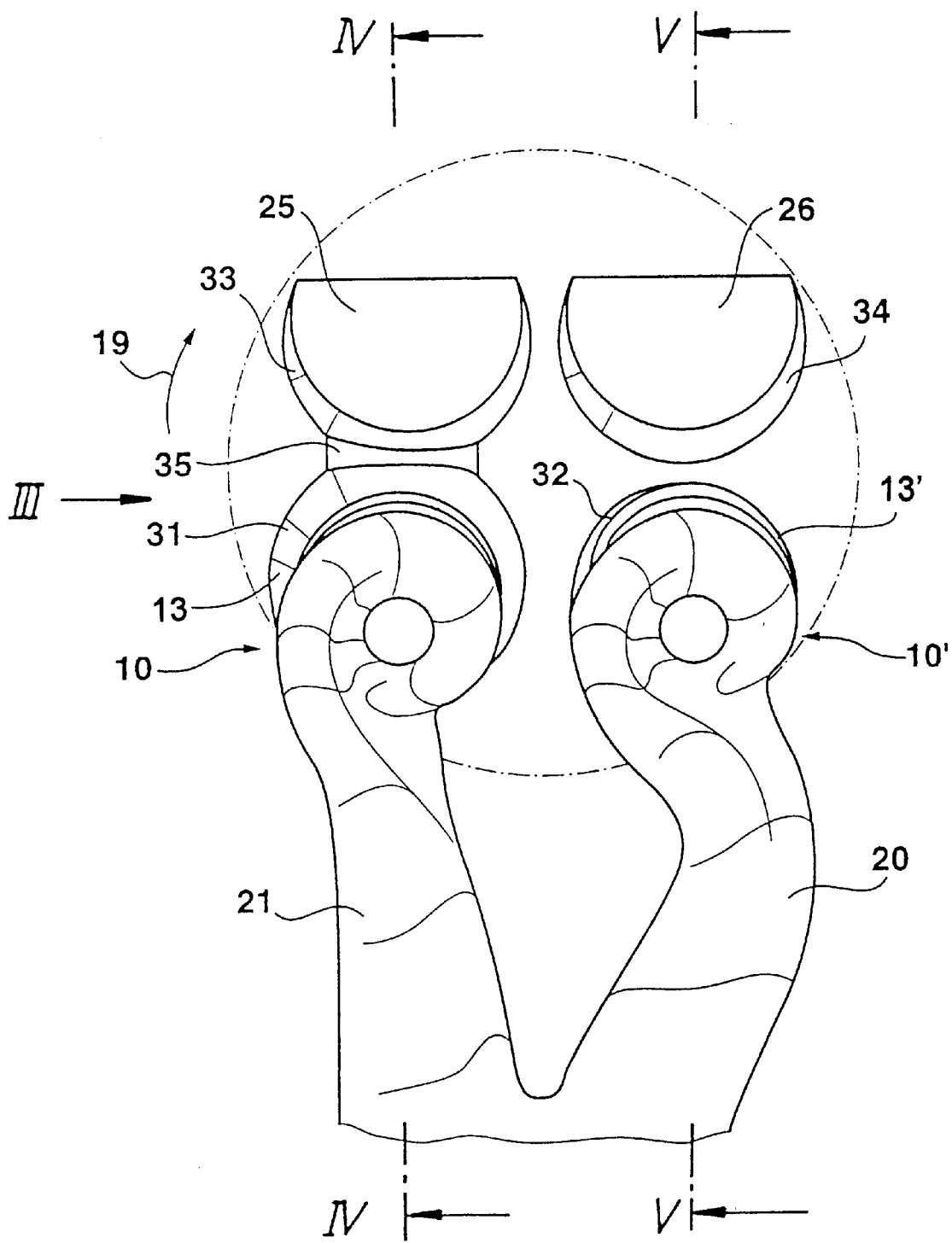
FIG. 2 is a plan view of the arrangement shown in FIG. 1.

As illustrated in FIG. 3 taken in the direction of arrow III in FIG. 2, and wherein line 30 represents a reference axis perpendicular to the bottom 22 of the cylinder head, and lines 41 and 42 represent the longitudinal axes of the valve stems of the respective inlet and exhaust valves, the inlet and exhaust valves are tilted V-like in opposite directions with respect to the axis 30. Conceivably, the exhaust valves could have their longitudinal axes substantially in parallel with the reference axis 30.

Figure 4:
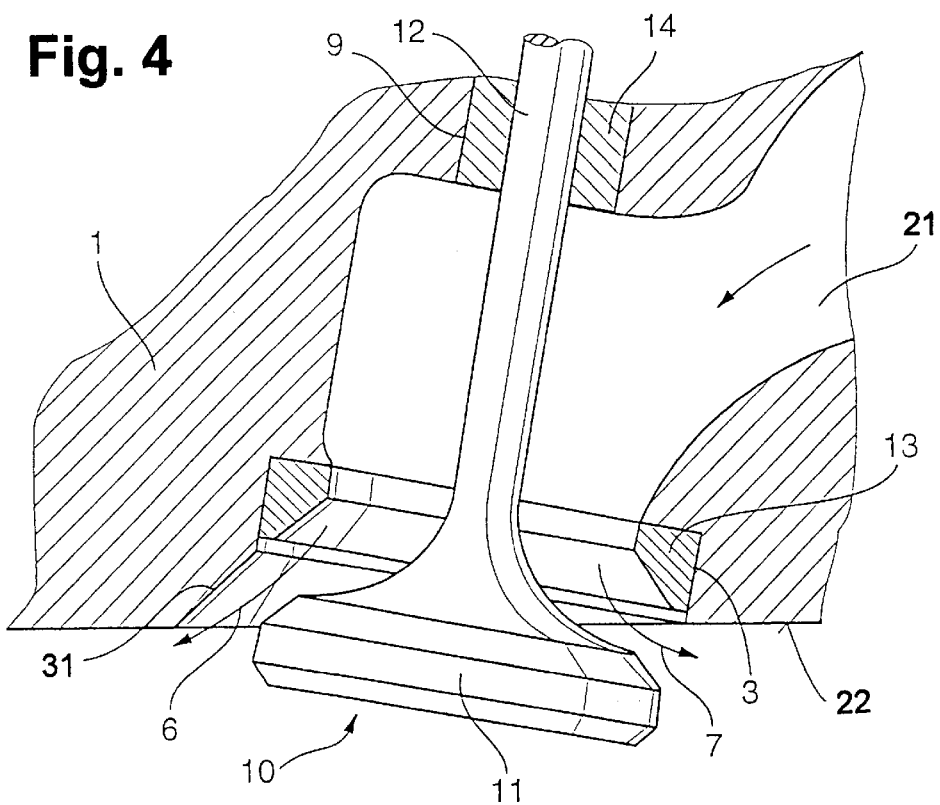
FIG. 4 is a sectional partial view, taken along line IV—IV in FIG. 2, of the cylinder head embodying the invention, showing one of the inlet valves.

Referring now to FIG. 4 taken along line IV—IV of FIG. 2, it shows a section of the cylinder head 1 including the inlet valve 10. As seen therefrom, the cylinder head 1 has a recess 3 formed in the bottom 22 thereof in which is lodged the seat ring 13 of the inlet valve 10. The latter includes further a valve disk 11, and a valve stem 12 operable to move the valve disk 11 into and out of engagement with the valve seat 13, the valve stem 12 being slidably supported in a guide sleeve 14 which is mounted in a bore 9 formed in the cylinder head 1.

As clearly seen from FIG. 4, the valve disk 11 and the annular valve seat 13 lie in planes which are inclined with respect to the bottom 22 of the cylinder head, the eccentric, crescent-shaped chamfer 31 being disposed on that side of the recess 3 which fully accommodates the valve disk 11 when the inlet valve 10 is closed.

FIG. 4 shows the inlet valve 10 in its open position and with its valve disk 11 moved a maximal distance from the seat ring 13. Due to the particular shape and orientation of the chamfer 31, the main flow of combustion air exiting the inlet valve 10 will be as indicated by the arrow 6, namely, through the gap defined by the chamfer 31, whereas a minor portion of the combustion air will exit at the opposite side through the gap between the seat ring 13 and the valve disk 11, as indicated by an arrow 7.

Figure 5:
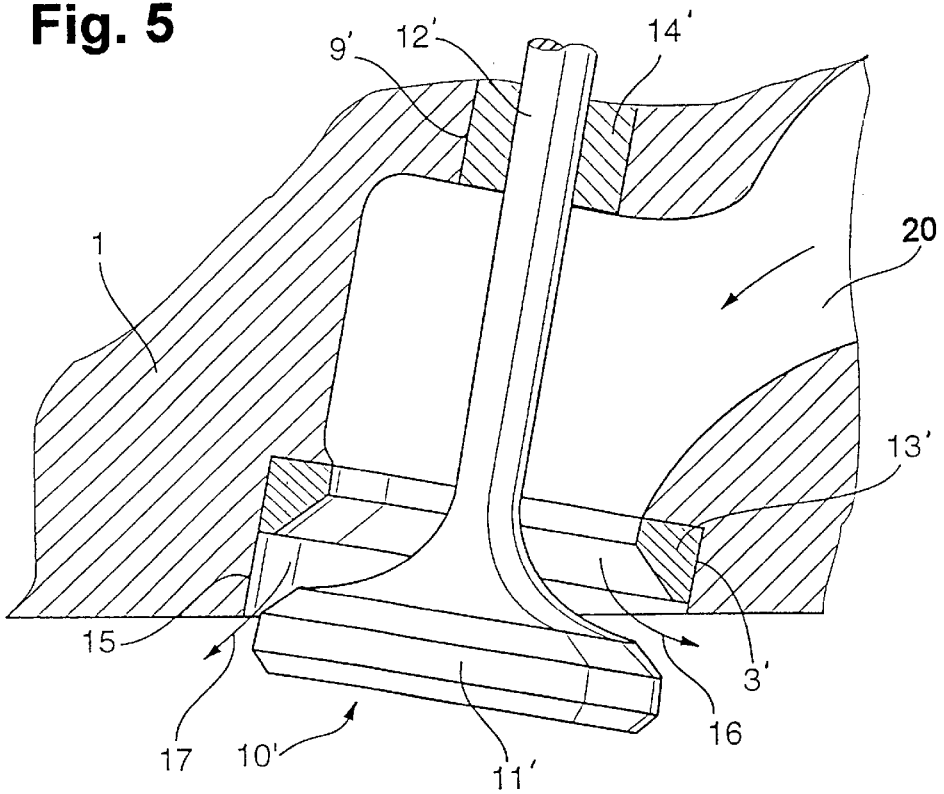
FIG. 5 is a view similar to FIG. 4 but taken along line V—V in FIG. 2 and showing the other inlet valve.

The other or trailing inlet valve 10', shown in FIG. 5, is basically the same as inlet valve 10, with one important exception, i.e., in the region where the inlet valve 10 has the crescent-shaped chamfer 31 (FIG. 4), the inlet valve 10' is provided instead with flow blocking means for preventing combustion air from exiting the trailing inlet valve 10' in a direction opposite to the direction of spin flow. More particularly, the flow blocking means comprises a surface 15 disposed within the recess 3' and extending from the valve-seat ring 13' to the bottom 22 of the cylinder head 1. The surface 15 abuts a peripheral portion of the trailing inlet valve 10' on the upstream side thereof, having regard to the direction of spin flow. Thus, upon movement of the trailing inlet valve 10' toward the open position thereof, combustion air will initially flow therethrough and into the combustion chamber only in the direction indicated by the arrow 16 and coinciding generally with the direction of spin flow 19. If the valve stroke continues beyond the point—say, beyond 10% for example of the maximal valve stroke—where the valve disk 11' rides off the flow blocking surface 15, a gap will appear also on the opposite side of the trailing inlet valve 10'; however, this gap will be considerably smaller than the downstream gap, having regard to the direction of spin flow, and only an insignificant amount of combustion air will pass therethrough, as indicated by the arrow 17, which due to the proximity of the chamfer 32 will promptly be redirected to follow the main stream indicated by the arrow 16.

FIG. 6 is a partial bottom view of the cylinder head 1 showing the circular outline 36 of a cylinder and a transverse axis 37 across the middle thereof. As seen therefrom, the valves 10, 10' and 38, 38' are arranged each in one quadrant of the circular outline 36, the inlet valves 10, 10' being disposed on one side of the transverse center axis 37, and the exhaust valves 38, 38' being disposed on its other side. As illustrated, the inlet valves 10, 10' are in the open positions thereof wherein their valve disks 11, 11' are off the associated valve seats, and the exhaust valves 38, 38' are in the closed positions thereof wherein their valve disks 11, 11' are seated. FIG. 6 clearly shows also the configuration of the various chamfers 31 to 34 as well as the web-like transition 35 between the two valves 10 and 38. The flow blocking surface 15 associated with the trailing inlet valve 10' and disposed on the upstream side thereof, having regard to the direction of spin flow 19, is not visible in FIG. 6. Reference numeral 40 designates an opening formed in the cylinder head at the center of the cylinder outline 36 and adapted to receive an injection nozzle (not shown).

What is claimed is:

1. A cylinder head for a cylinder of an internal combustion engine, particularly a diesel engine with direct fuel injection, said cylinder head including two inlet valves each including a movable valve disk and a valve seat associated therewith, and spin-inducing means for causing combustion air introduced through said inlet valves to spin about the longitudinal axis of the cylinder, said spin-inducing means including an eccentric, crescent-shaped chamfer associated, with retard to the direction of spin, with the leading one of said two inlet valves and facing in the direction of spin, and further including flow blocking means associated, with regard to the direction of spin, with the trailing one of said two inlet valves and adapted to prevent combustion air from exiting said trailing inlet valve in a direction opposed to the direction of spin flow.

2. A cylinder head according to claim 1, wherein said flow blocking means is effective throughout at least 10% of a maximal valve stroke.

3. A cylinder head according to claim 1, including two exhaust valves, wherein said inlet and exhaust valves are tilted with regard to the bottom of the cylinder head in a manner such that the valve stems of the inlet and exhaust valves are aligned V-like with respect to one another.

4. A cylinder head according to claim 1, wherein said flow blocking means comprises a surface disposed at said trailing inlet valve on the upstream side thereof, having regard to the direction of spin flow, which surface abuts a peripheral portion of the valve disk of the trailing inlet valve.

5. A cylinder head according to claim 4, wherein said surface extends from the valve seat of said trailing inlet valve toward the bottom of the cylinder head for a distance corresponding to at least 10% of a maximal valve stroke.

6. A cylinder head according to claim 1, including an exhaust valve disposed adjacent said leading inlet valve, wherein said crescent-shaped chamfer of the leading inlet valve spans a predetermined arc and, at its widest region, is directed toward the adjacent exhaust valve.

7. A cylinder head according to claim 6, wherein said crescent-shaped chamfer of the leading inlet valve and the chamfer of the adjacent exhaust valve are contiguous to each other and have a web-like transition formed therebetween.

8. A cylinder head according to claim 1 including two exhaust valves each having associated therewith a chamfer which is directed toward the inlet valve adjacent thereto.

9. A cylinder head according to claim 8, wherein the chamfers of the two exhaust valves are substantially identical with respect to size and orientation, each of them spanning a predetermined arc.

10. A cylinder head according to claim 1, wherein said spin-inducing means include a chamfer disposed at said trailing inlet valve.

11. A cylinder head according to claim 10, wherein said chamfer at the trailing inlet valve is directed toward said leading inlet valve.

12. A cylinder head according to claim 6, wherein said spin-inducing means include a chamfer disposed at said trailing inlet valve and directed diagonally toward the exhaust valve adjacent said leading inlet valve.

13. A cylinder head according to claim 10, wherein said chamfer at the trailing inlet valve is substantially smaller than the chamfer at said leading inlet valve.

14. A cylinder head according to claim 13, wherein said chamfer at the trailing inlet valve spans an arc of about 90 degrees.

15. A cylinder head according to claim 10, wherein said chamfer at the trailing inlet valve is dimensioned so as to contribute to enhancing spin flow also during short valve strokes.

* * * * *